(12) United States Patent
Huang et al.

(10) Patent No.: US 11,288,831 B2
(45) Date of Patent: Mar. 29, 2022

(54) INFORMATION MEASURING METHOD AND INFORMATION MEASURING SYSTEM

(71) Applicant: VIVOTEK INC., New Taipei (TW)

(72) Inventors: Chao-Tan Huang, New Taipei (TW); Cheng-Chieh Liu, New Taipei (TW)

(73) Assignee: VIVOTEK INC., New Taipei (TW)

( * ) Notice: Subject to any disclaimer, the term of this patent is extended or adjusted under 35 U.S.C. 154(b) by 92 days.

(21) Appl. No.: 16/680,507

(22) Filed: Nov. 12, 2019

(65) Prior Publication Data

US 2020/0184672 A1 Jun. 11, 2020

(30) Foreign Application Priority Data

Dec. 5, 2018 (TW) .................................. 107143567

(51) Int. Cl.
*G06T 7/70* (2017.01)
(52) U.S. Cl.
CPC ...... *G06T 7/70* (2017.01); *G06T 2207/30244* (2013.01)
(58) Field of Classification Search
CPC .... G06T 7/70; G06T 7/73; G06T 7/74; G06T 7/75; G06T 7/80; G06T 2207/30244; G06T 2219/2004
USPC ....... 382/100, 103, 106, 123, 291, 287, 151, 382/294
See application file for complete search history.

(56) References Cited

U.S. PATENT DOCUMENTS

| | | | | |
|---|---|---|---|---|
| 5,699,444 A | * | 12/1997 | Palm | G06T 7/55 382/106 |
| 6,449,516 B1 | * | 9/2002 | Kyomasu | B23K 20/004 700/58 |
| 6,539,326 B1 | * | 3/2003 | Hirano | G03F 9/7026 250/548 |
| 6,639,659 B2 | * | 10/2003 | Granger | G01B 11/002 348/94 |
| 6,668,075 B1 | * | 12/2003 | Nakamura | G06T 7/0006 348/95 |

(Continued)

FOREIGN PATENT DOCUMENTS

| | | |
|---|---|---|
| CN | 107995414 A | 5/2018 |
| JP | 2005130007 | 5/2005 |

(Continued)

*Primary Examiner* — Sean M Conner
*Assistant Examiner* — Stephen M Brinich
(74) *Attorney, Agent, or Firm* — Winston Hsu

(57) ABSTRACT

An information measuring method is used for measuring installation information of a camera disposed over a plane with an installation height and oriented towards the plane with a shooting angle. The information measuring method includes steps of disposing a first reference point and a second reference point on the plane; measuring a first distance and a second distance between the first reference point, the second reference point and a third reference point; capturing an image including the first reference point, the second reference point and the third reference point; analyzing the image to define a first reference line and a second reference line; determining a first angle and a second angle according to the first reference line, the second reference line and a first normal line; and determining the installation height and/or the shooting angle according to the first distance, the second distance, the first angle and the second angle.

6 Claims, 7 Drawing Sheets

(56) References Cited

U.S. PATENT DOCUMENTS

| | | | | |
|---|---|---|---|---|
| 8,368,761 | B2* | 2/2013 | Chung | B60R 1/00 348/175 |
| 9,965,870 | B2* | 5/2018 | Claveau | G06T 7/80 |
| 2001/0046315 | A1* | 11/2001 | Sentoku | G03F 9/7015 382/151 |
| 2004/0042648 | A1* | 3/2004 | Yoshidda | G06T 7/74 382/151 |
| 2007/0076262 | A1* | 4/2007 | Umeda | G06K 15/02 358/3.28 |
| 2008/0007720 | A1* | 1/2008 | Mittal | H04N 5/247 356/138 |
| 2009/0010630 | A1* | 1/2009 | Higashihara | H04N 5/23238 396/50 |
| 2011/0317016 | A1* | 12/2011 | Saeki | G08B 13/1968 348/154 |
| 2012/0038766 | A1* | 2/2012 | Park | G08B 13/19652 348/143 |
| 2012/0069190 | A1* | 3/2012 | Nam | H04N 7/181 348/159 |
| 2012/0275022 | A1 | 11/2012 | Oh | |
| 2012/0307067 | A1* | 12/2012 | Chen | H04N 7/181 348/159 |
| 2013/0010106 | A1* | 1/2013 | Yokota | H04N 13/239 348/135 |
| 2013/0170735 | A1* | 7/2013 | Abe | B41F 15/26 382/151 |
| 2017/0339400 | A1* | 11/2017 | Hall | H04N 5/247 |
| 2018/0373015 | A1* | 12/2018 | Sakamoto | G02B 27/40 |
| 2019/0208182 | A1* | 7/2019 | Aoki | G06T 7/85 |

FOREIGN PATENT DOCUMENTS

| | | |
|---|---|---|
| TW | M361016 U1 | 7/2009 |
| TW | I500904 B | 9/2015 |
| TW | I624181 B | 5/2018 |

* cited by examiner

INFORMATION MEASURING METHOD AND INFORMATION MEASURING SYSTEM

BACKGROUND OF THE INVENTION

1. Field of the Invention

The invention relates to an information measuring method and an information measuring system and, more particularly, to an information measuring method and an information measuring system for measuring installation information of a camera.

2. Description of the Prior Art

Since safety awareness is being raised gradually, people pay much attention to safety surveillance application. So far in many public or non-public places, there are always one or more cameras installed for safety surveillance. After capturing an image of the real world, the camera may obtain a corresponding coordinate of the real world from the image according to a lens characteristic. However, before calculating the corresponding coordinate of the real world, it needs to know installation information including an installation height and a shooting angle of the camera. Since the aforesaid installation information of the camera usually has to be measured on the spot where the camera is disposed manually, it is inefficient and consumes additional labor cost.

SUMMARY OF THE INVENTION

An objective of the invention is to provide an information measuring method and an information measuring system for measuring installation information of a camera, so as to solve the aforesaid problems.

According to an embodiment of the invention, an information measuring method is used for measuring installation information of a camera. The camera is disposed over a plane with an installation height and oriented towards the plane with a shooting angle. The camera comprises a lens and the lens has an optical center. The information measuring method comprises steps of disposing a first reference point and a second reference point on the plane, wherein a first normal line of the lens passes through the optical center and intersects with the plane at a third reference point; measuring a first distance and a second distance between the first reference point, the second reference point and the third reference point; capturing an image including the first reference point, the second reference point and the third reference point; analyzing the image to define a first reference line and a second reference line, wherein the first reference line passes through the first reference point and the optical center, and the second reference line passes through the second reference point and the optical center; determining a first angle and a second angle according to the first reference line, the second reference line and the first normal line; and determining the installation height and/or the shooting angle according to the first distance, the second distance, the first angle and the second angle.

According to another embodiment of the invention, an information measuring system is used for measuring installation information of a camera. The camera is disposed over a plane with an installation height and oriented towards the plane with a shooting angle. A first reference point and a second reference point are disposed on the plane. The information measuring system comprises a lens, an image sensor and a processor. The lens is disposed in the camera and the lens has an optical center. A first normal line of the lens passes through the optical center and intersects with the plane at a third reference point. A first distance and a second distance exist between the first reference point, the second reference point and the third reference point. The image sensor is disposed in the camera. The image sensor captures an image including the first reference point, the second reference point and the third reference point. The processor analyzes the image to define a first reference line and a second reference line. The first reference line passes through the first reference point and the optical center. The second reference line passes through the second reference point and the optical center. The processor determines a first angle and a second angle according to the first reference line, the second reference line and the first normal line. The processor determines the installation height and/or the shooting angle according to the first distance, the second distance, the first angle and the second angle.

As mentioned in the above, after disposing the first reference point and the second reference point on the plane, the invention can determine the installation information including the installation height and/or the shooting angle of the camera by analyzing the image captured by the camera. Accordingly, the invention can not only improve the measurement of the installation information of the camera effectively but also avoid consuming additional labor cost.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
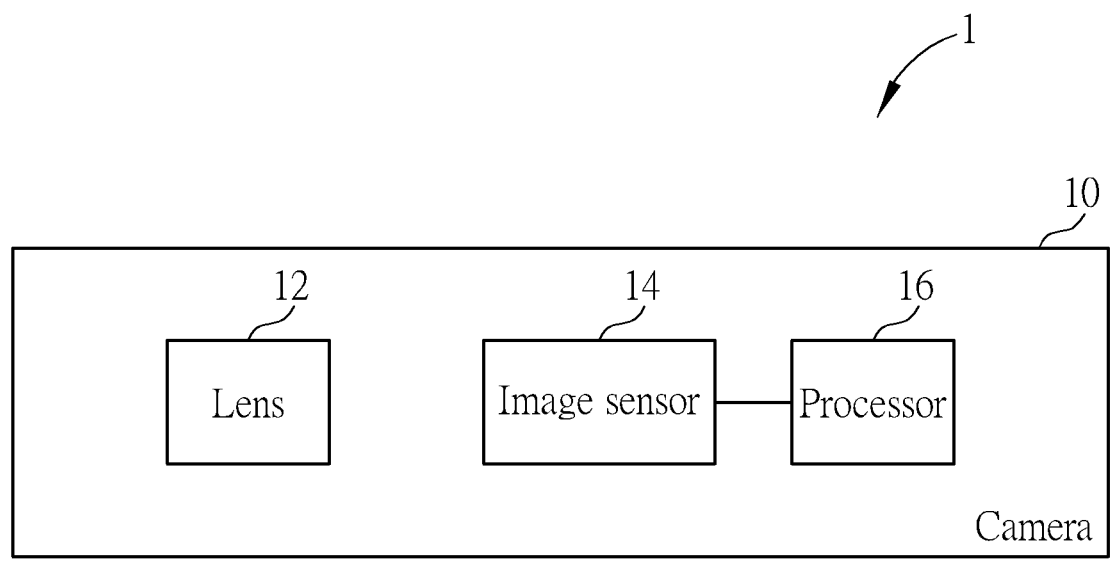
FIG. 1 is a functional block diagram illustrating an information measuring system according to an embodiment of the invention.
Figure 2:
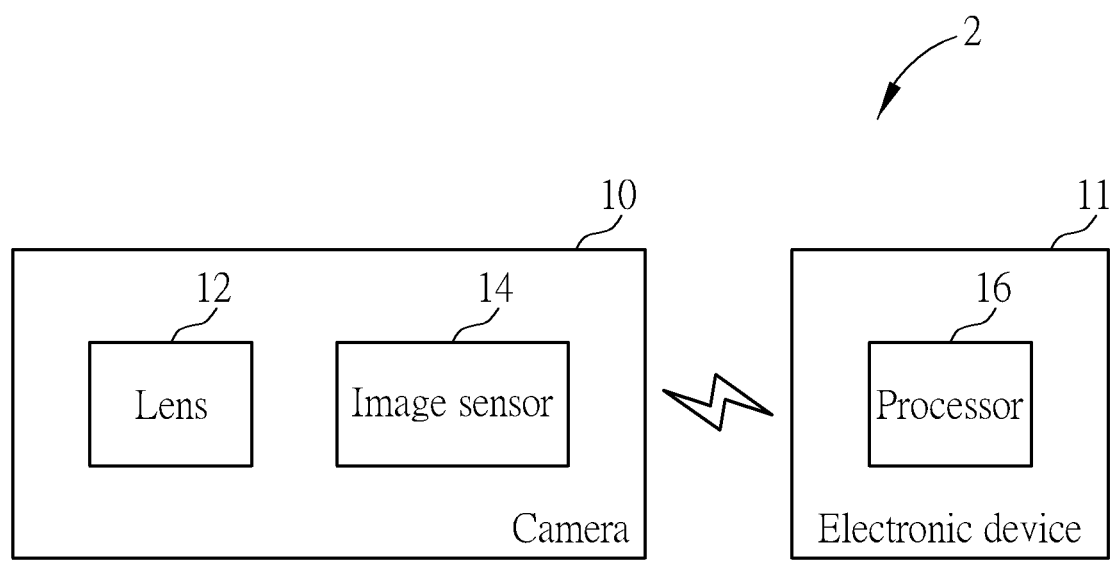
FIG. 2 is a functional block diagram illustrating an information measuring system according to another embodiment of the invention.
Figure 3:
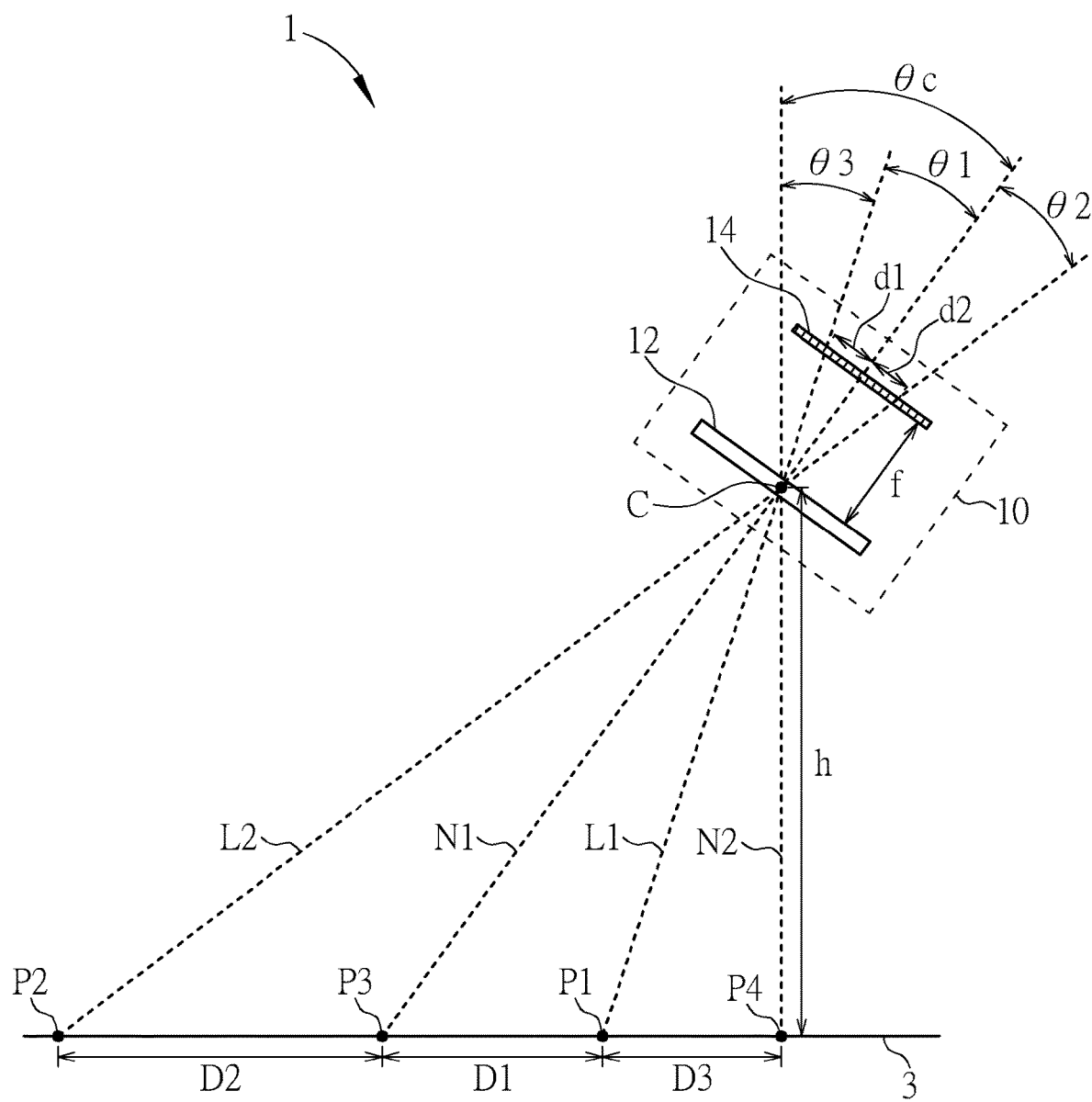
FIG. 3 is a schematic view illustrating a camera disposed over a plane according to an embodiment of the invention.
Figure 4:
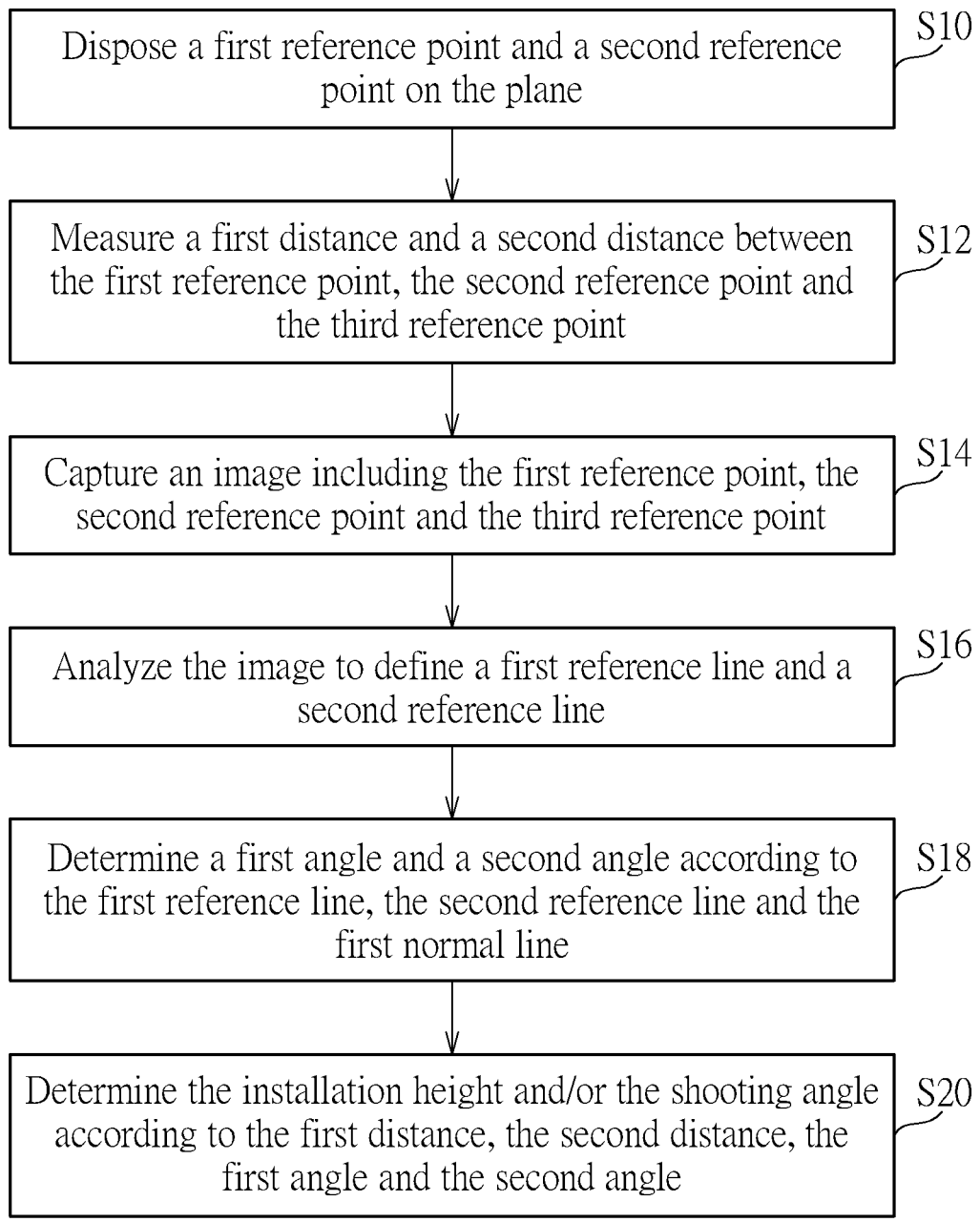
FIG. 4 is a flowchart illustrating an information measuring method according to an embodiment of the invention.

Referring to FIGS. 1 to 4, FIG. 1 is a functional block diagram illustrating an information measuring system 1 according to an embodiment of the invention, FIG. 2 is a functional block diagram illustrating an information measuring system 2 according to another embodiment of the invention, FIG. 3 is a schematic view illustrating a camera 10 disposed over a plane 3 according to an embodiment of the invention, and FIG. 4 is a flowchart illustrating an information measuring method according to an embodiment of the invention. The information measuring method shown in FIG. 4 is adapted to the information measuring system 1 shown in FIG. 1 and the information measuring system 2 shown in FIG. 2.

As shown in FIG. 1, the information measuring system 1 comprises a lens 12, an image sensor 14 and a processor 16. In this embodiment, the information measuring system 1 may essentially consist of a camera 10, wherein the lens 12, the image sensor 14 and the processor 16 are disposed in the camera 10. As shown in FIG. 2, the information measuring system 2 may essentially consist of a camera 10 and an electronic device 11 and both communicate with each other through a network, wherein the lens 12 and the image sensor 14 are disposed in the camera 10 and the processor 16 is disposed in the electronic device 11. The aforesaid electronic device 11 may be a mobile phone, a tablet computer, a desktop computer, a server or other electronic devices with data processing/calculating function. In practical applications, the image sensor 14 may be a charge-coupled device (CCD) sensor or a complementary metal-oxide semiconductor (CMOS) sensor, and the processor 16 may be a processor or a controller with data processing/calculating function.

As shown in FIG. 3, the camera 10 is disposed over a plane 3 with an installation height h and oriented towards the plane 3 with a shooting angle θc, wherein the camera 10 comprises the lens 12 and the image sensor 14 and the lens 12 has an optical center C. Furthermore, a first reference point P1 and a second reference point P2 are disposed on the plane 3. According to the first reference point P1 and the second reference point P2, the information measuring system 1 and the information measuring method of the invention can be used for measuring installation information of the camera 10, wherein the installation information comprises the installation height h and/or the shooting angle θc.

When the information measuring method is performed by the information measuring system 1, first, the invention disposes a first reference point P1 and a second reference point P2 on the plane 3 (step S10 in FIG. 4), wherein a first normal line N1 of the lens 12 passes through the optical center C of the lens 12 and intersects with the plane 3 at a third reference point P3, such that a first distance D1 and a second distance D2 exist between the first reference point P1, the second reference point P2 and the third reference point P3. In this embodiment, the third reference point P3 is located between the first reference point P1 and the second reference point P2, the first reference point P1 and the third reference point P3 are spaced by the first distance D1, and the second reference point P2 and the third reference point P3 are spaced by the second distance D2, as shown in FIG. 2. In other words, the first reference point P1 and the second reference point P2 are located at opposite sides of the first normal line N1.

Then, the invention measures the first distance D1 and the second distance D2 between the first reference point P1, the second reference point P2 and the third reference point P3 (step S12 in FIG. 4). In this embodiment, the first distance D1 and the second distance D2 may be measured manually, but is not so limited. In another embodiment, the first distance D1 and the second distance D2 may also be measured by a position generator (not shown), wherein the position generator may be a global positioning system (GPS) module, an augmented reality kit (ARKit) or other modules capable of generating position information.

Then, the image sensor 14 captures an image including the first reference point P1, the second reference point P2 and the third reference point P3 (step S14 in FIG. 4). Then, the processor 16 analyzes the image to define a first reference line L1 and a second reference line L2, wherein the first reference line L1 passes through the first reference point P1 and the optical center C, and the second reference line L2 passes through the second reference point P2 and the optical center C (step S16 in FIG. 4). Then, the processor 16 determines a first angle θ1 and a second angle θ2 according to the first reference line L1, the second reference line L2 and the first normal line N1 (step S18 in FIG. 4). In this embodiment, the first angle θ1 is included between the first reference line L1 and the first normal line N1, and the second angle θ2 is included between the second reference line L2 and the first normal line N1. Then, the processor 16 determines the installation height h and/or the shooting angle θc according to the first distance D1, the second distance D2, the first angle θ1 and the second angle θ2 (step S20 in FIG. 4).

As shown in FIG. 3, a second normal line N2 of the plane 3 passes through the optical center C of the lens 12 and the second normal line N2 intersects with the plane 3 at a fourth reference point p4. Furthermore, the first reference point P1 is located between the third reference point P3 and the fourth reference point P4, a third angle θ3 is included between the first reference line L1 and the second normal line N2, and the first reference point P1 and the fourth reference point P4 are spaced by a third distance D3. It should be noted that the shooting angle θc is an angle included between the first normal line N1 and the second normal line N2, i.e. the sum of the first angle θ1 and the third angle θ3.

The third distance D3 may be obtained by the following equation 1.

$$D3 = h*\tan(\theta 3). \quad \text{Equation 1:}$$

The first distance may be obtained by the following equation 2.

$$D1 = h*\tan(\theta 1 + \theta 3) - D3 = h*\tan(\theta 1 + \theta 3) - h*\tan(\theta 3). \quad \text{Equation 2:}$$

The second distance D2 may be obtained by the following equation 3.

$$D2 = h*\tan(\theta 1 + \theta 2 + \theta 3) - D1 - D3 = h[\tan(\theta 1 + \theta 2 + \theta 3) - \tan(\theta 1 + \theta 3)]. \quad \text{Equation 3:}$$

The equations 2 and 3 may be combined to obtain the following equation 4.

$$\frac{D1}{D2} = \frac{\tan(\theta 1 + \theta 3) - \tan(\theta 3)}{\tan(\theta 1 + \theta 2 + \theta 3) - \tan(\theta 1 + \theta 3)}. \quad \text{Equation 4}$$

The equation 4 may be converted into the following equation 5 according to angle-sum identities for tangent function.

$$\tan(\theta 3) = \frac{\left\{1 - \frac{\frac{D1}{D2}[\tan(\theta 1 + \theta 2) - \tan(\theta 1)]}{\tan(\theta 1)}\right\}}{\tan(\theta 1 + \theta 2)}. \quad \text{Equation 5}$$

In this embodiment, the first angle θ1 and the second angle θ2 may be obtained by the following equations 6 and 7.

$$\theta_1 = \arctan\left(\frac{d1}{f}\right).\qquad\text{Equation 6}$$

$$\theta_2 = \arctan\left(\frac{d2}{f}\right).\qquad\text{Equation 7}$$

In the equations 6 and 7, f represents a distance between the lens 12 and the image sensor 14, d1 represents a distance between the first normal line N1 and an image position of the first reference point P1 on the image sensor 14, and d2 represents a distance between the first normal line N1 and an image position of the second reference point P2 on the image sensor 14, as shown in FIG. 3. In this embodiment, the distances d1 and d2 may be obtained by analyzing the image and the distance f may be obtained by parameters of the camera 10. Accordingly, the first angle θ1 and the second angle θ2 may be obtained according to the equations 6 and 7. In another embodiment, the invention may look up the distances d1 and d2 in a distortion table of the lens 12 according to practical applications. It should be noted that the aforesaid distortion table is well known by one skilled in the art, so it will not be depicted herein in detail.

Furthermore, the first distance D1 and the second distance D2 have been measured in the aforesaid step S12. Accordingly, the first angle θ1, the second angle θ2, the first distance D1 and the second distance D2 may be introduced into the equation 5, so as to obtain the third angle θ3.

Then, the shooting angle θc and the installation height h may be obtained according to the following equations 8 and 9, respectively.

$$\theta c = \theta_1 + \theta_3.\qquad\text{Equation 8}$$

$$h = \frac{D2}{[\tan(\theta_1+\theta_2+\theta_3)-\tan(\theta_1+\theta_3)]}.\qquad\text{Equation 9}$$

Therefore, after disposing the first reference point P1 and the second reference point P2 on the plane 3, the information measuring system of the invention can determine the installation information including the installation height h and/or the shooting angle θc of the camera 10 by analyzing the image captured by the camera 10. Accordingly, the invention can not only improve the measurement of the installation information of the camera 10 effectively but also avoid consuming additional labor cost.

Figure 5:
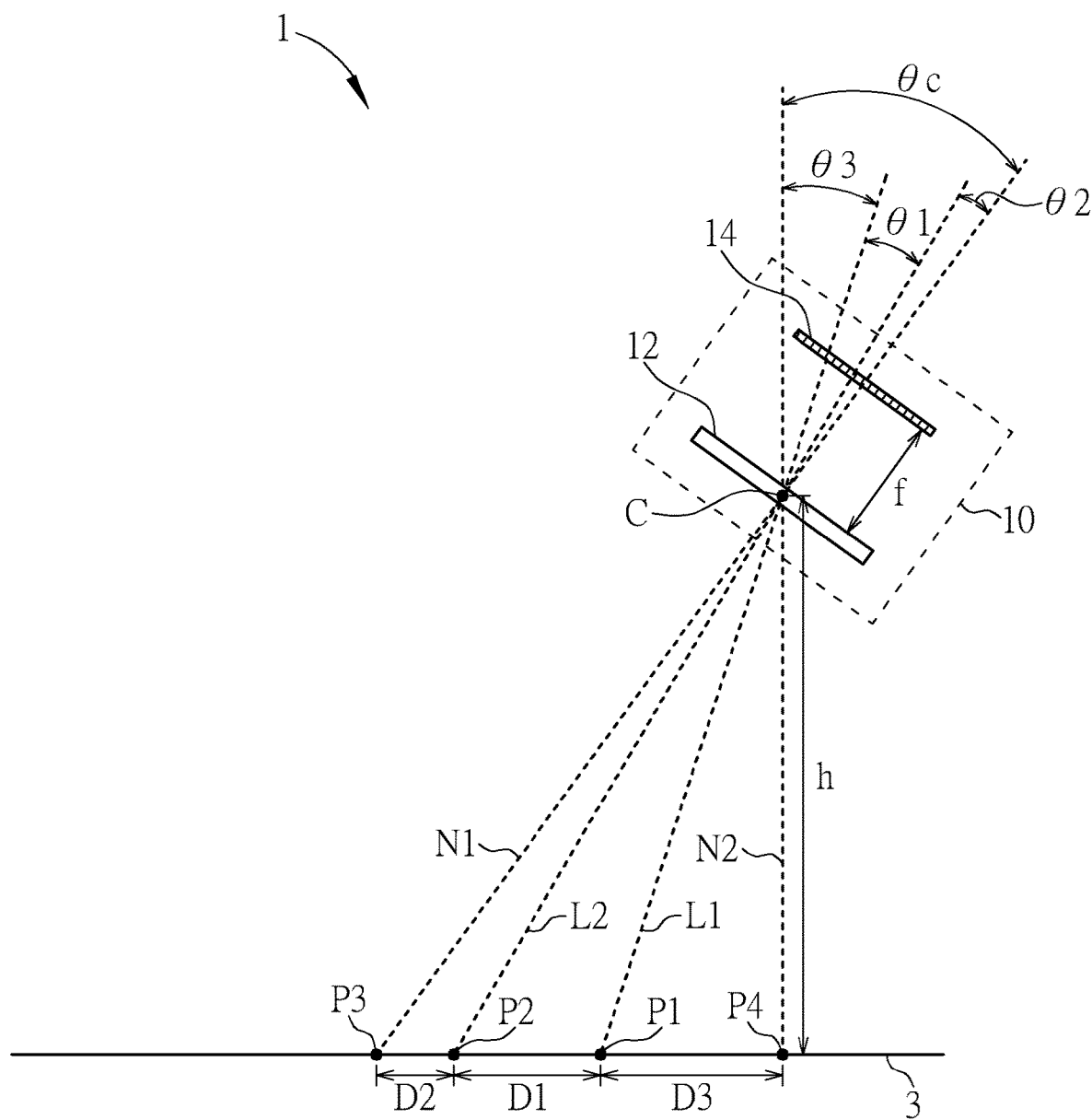
FIG. 5 is a schematic view illustrating the camera disposed over the plane according to another embodiment of the invention.

Referring to FIG. 5, FIG. 5 is a schematic view illustrating the camera 10 disposed over the plane 3 according to another embodiment of the invention. In this embodiment, the first reference point P1 is located between the second reference point P2 and the fourth reference point P4, the second reference point P2 is located between the first reference point P1 and the third reference point P3, the first reference point P1 and the second reference point P2 are spaced by the first distance D1, the second reference point P2 and the third reference point P3 are spaced by the second distance D2, the first angle θ1 is included between the first reference line L1 and the second reference line L2, the second angle θ2 is included between the second reference line L2 and the first normal line N1, a third angle θ3 is included between the first reference line L1 and the second normal line N2, and the first reference point P1 and the fourth reference point P4 are spaced by a third distance D3, as shown in FIG. 5.

At this time, the third angle θ3 and the installation height h may still be obtained according to the aforesaid equations 5 and 9. Furthermore, the shooting angle θc is an angle included between the first normal line N1 and the second normal line N2, i.e. the sum of the first angle θ1, the second angle θ2 and the third angle θ3. Accordingly, the shooting angle θc may be obtained according to the following equation 10.

$$\theta c = \theta_1 + \theta_2 + \theta_3.\qquad\text{Equation 10:}$$

Figure 6:
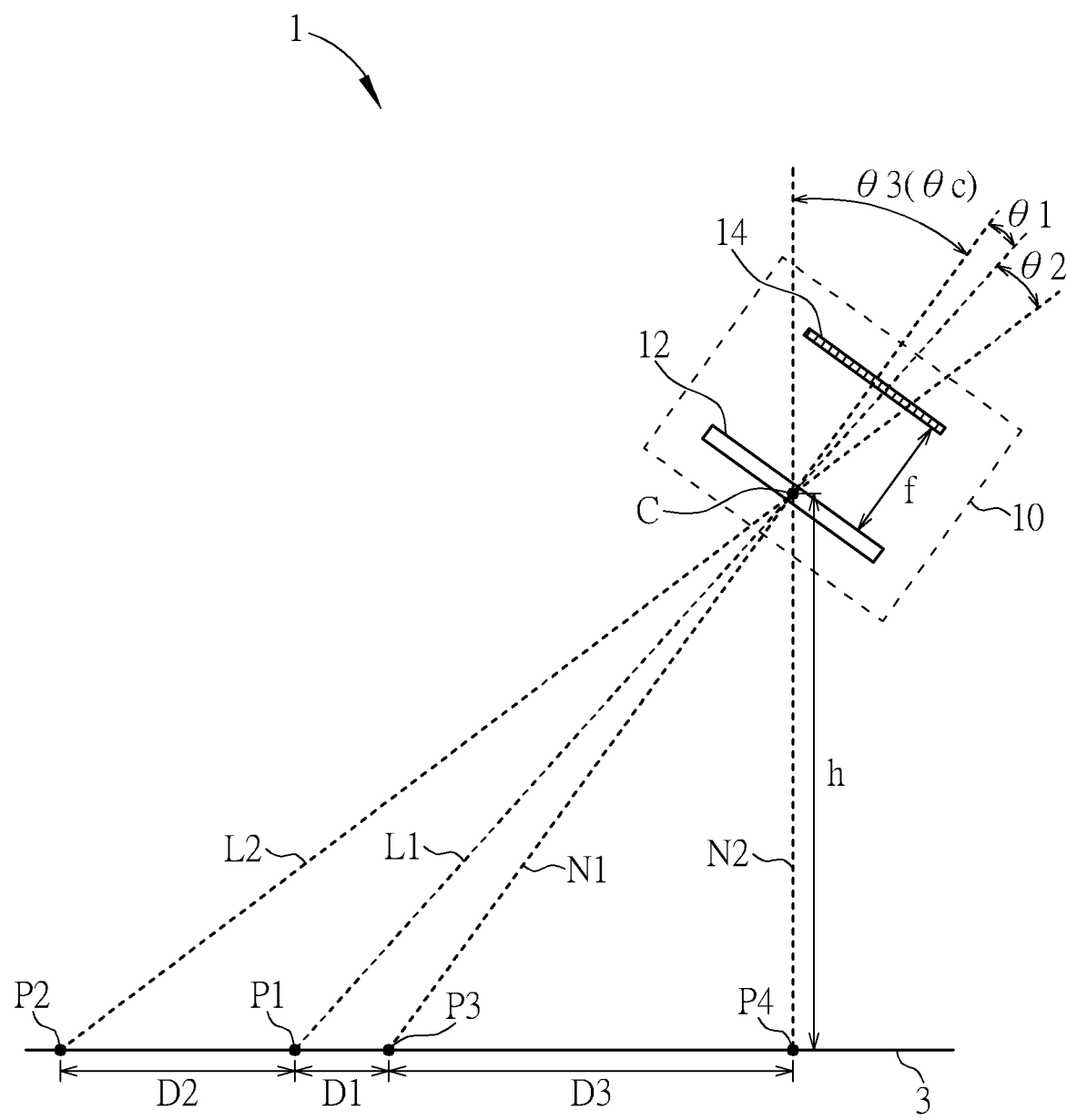
FIG. 6 is a schematic view illustrating the camera disposed over the plane according to another embodiment of the invention.

Referring to FIG. 6, FIG. 6 is a schematic view illustrating the camera 10 disposed over the plane 3 according to another embodiment of the invention. In this embodiment, the first reference point P1 is located between the second reference point P2 and the third reference point P3, the third reference point P3 is located between the first reference point P1 and the four reference point P4, the first reference point P1 and the third reference point P3 are spaced by the first distance D1, the second reference point P2 and the first reference point P1 are spaced by the second distance D2, the first angle θ1 is included between the first reference line L1 and the first normal line N1, the second angle θ2 is included between the second reference line L2 and the first reference line L1, a third angle θ3 is included between the first normal line N1 and the second normal line N2, and the third reference point P3 and the fourth reference point P4 are spaced by a third distance D3, as shown in FIG. 6.

At this time, the third angle θ3 and the installation height h may still be obtained according to the aforesaid equations 5 and 9. Furthermore, the shooting angle θc is an angle included between the first normal line N1 and the second normal line N2, i.e. the shooting angle θc is equal to the third angle θ3. Accordingly, the shooting angle θc may be obtained according to the following equation 11.

$$\theta c = \theta_3.\qquad\text{Equation 11:}$$

Figure 7:
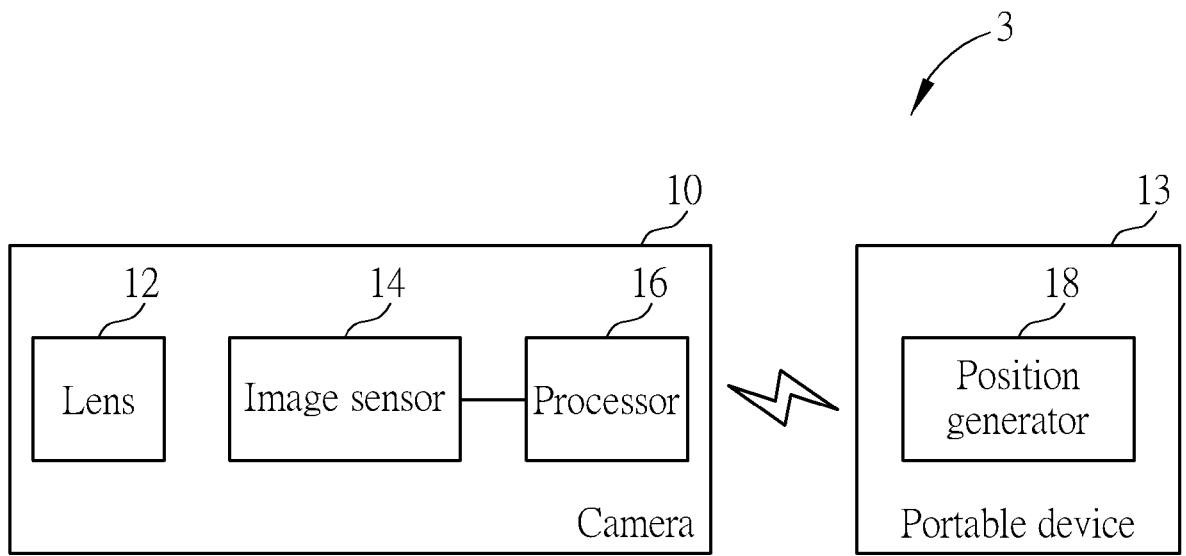
FIG. 7 is a functional block diagram illustrating an information measuring system according to another embodiment of the invention.

Referring to FIG. 7, FIG. 7 is a functional block diagram illustrating an information measuring system 3 according to another embodiment of the invention. The main difference between the information measuring system 3 and the aforesaid information measuring system 1 is that the information measuring system 3 further comprises a position generator 18, wherein the position generator 18 may be a global positioning system (GPS) module, an augmented reality kit (ARKit) or other modules capable of generating position information. In this embodiment, the position generator 18 may be disposed in a portable device 13 (e.g. mobile phone, tablet computer, etc.) and the portable device 13 may communicate with the camera 10 shown in FIGS. 3, 5 and 6. A user may carry the portable device 13 equipped with the position generator 18 and move between the first reference point P1, the second reference point P2 and the third reference point P3 shown in FIGS. 3, 5 and 6, so as to measure the first distance D1 and the second distance D2.

In this embodiment, the portable device 13 may transmit coordinates of the first reference point P1, the second reference point P2 and the third reference point P3 obtained by the position generator 18 to the camera 10. Then, the processor 16 of the camera 10 calculates the first distance D1 and the second distance D2 and then calculates the installation information including the installation height h and/or the shooting angle θc.

Figure 8:
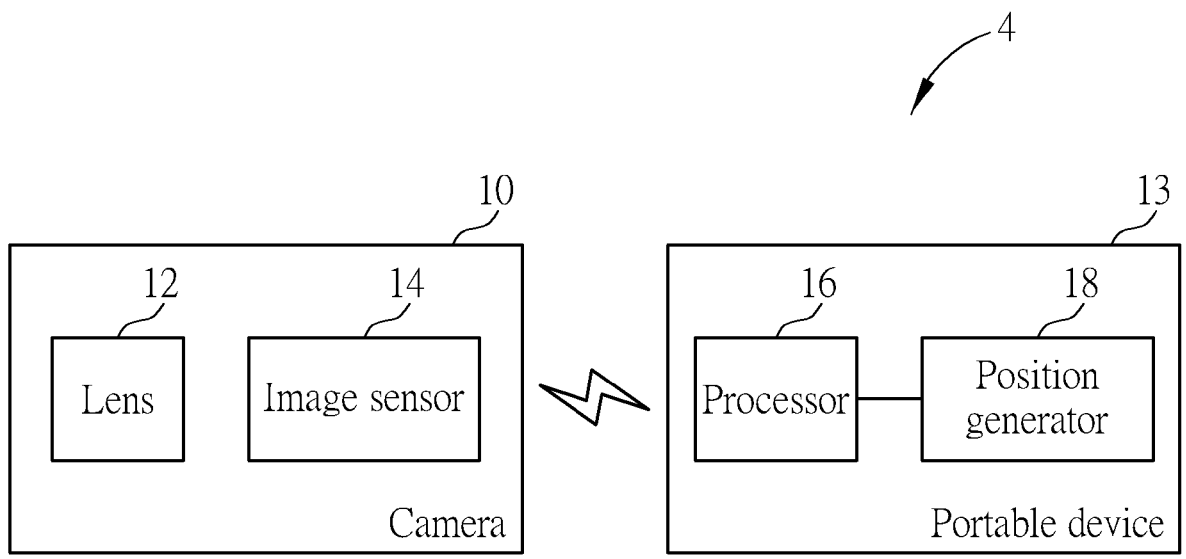
FIG. 8 is a functional block diagram illustrating an information measuring system according to another embodiment of the invention.

Referring to FIG. 8, FIG. 8 is a functional block diagram illustrating an information measuring system 4 according to another embodiment of the invention. The main difference between the information measuring system 4 and the aforesaid information measuring system 3 is that the processor 16 of the information measuring system 4 is disposed in the portable device 13. In other words, the processor 16 and the position generator 18 may be disposed in the portable device 13 communicating with the camera 10. In this embodiment, the processor 16 of the portable device 13 may calculate the first distance D1 and the second distance D2 according to coordinates of the first reference point P1, the second reference point P2 and the third reference point P3 obtained by the position generator 18 and the camera 10 may transmit the first angle θ1, the second angle θ2 and the third angle θ3 to the portable device 13, such that the processor 16 of the portable device 13 may calculate the installation information including the installation height h and/or the shooting angle θc.

Figure 9:
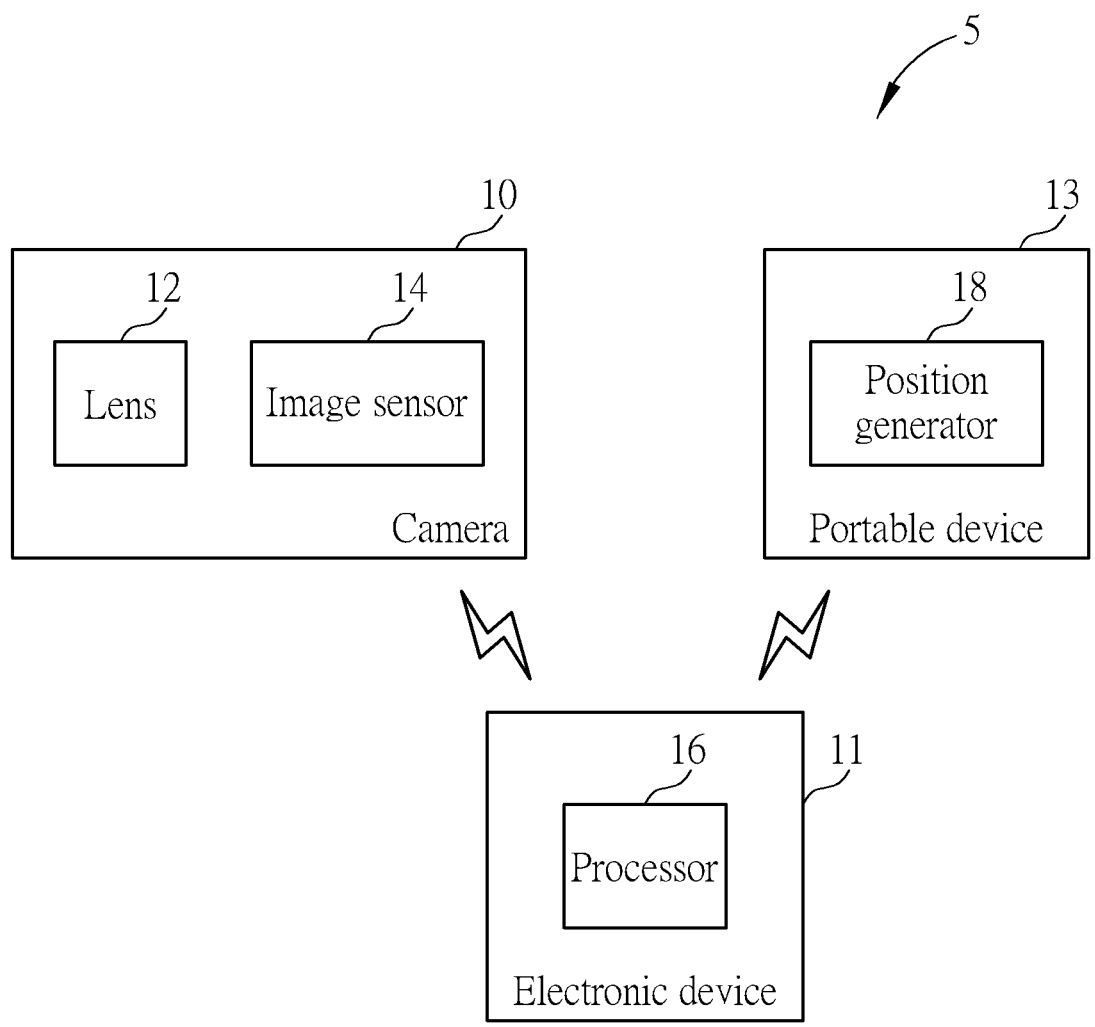
FIG. 9 is a functional block diagram illustrating an information measuring system according to another embodiment of the invention.

Referring to FIG. 9, FIG. 9 is a functional block diagram illustrating an information measuring system 5 according to another embodiment of the invention. The main difference between the information measuring system 5 and the aforesaid information measuring system 3 is that the processor 16 of the information measuring system 5 is disposed in the electronic device 11. In this embodiment, the portable device 13 may transmit coordinates of the first reference point P1, the second reference point P2 and the third reference point P3 obtained by the position generator 18 to the electronic device 11 and the camera 10 may transmit the first angle θ1, the second angle θ2 and the third angle θ3 to the electronic device 11, such that the processor 16 of the electronic device 11 may calculate the installation information including the installation height h and/or the shooting angle θc.

As mentioned in the above, after disposing the first reference point and the second reference point on the plane, the invention can determine the installation information including the installation height and/or the shooting angle of the camera by analyzing the image captured by the camera. The calculation may be performed individually or collectively by different processors and the required information may be transmitted to the processor in charge of the calculation through communication. Accordingly, the invention can not only improve the measurement of the installation information of the camera effectively but also avoid consuming additional labor cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An information measuring method for measuring installation information of a camera, the camera being disposed over a plane with an installation height and oriented towards the plane with a shooting angle, the camera comprising a lens, the lens having an optical center, the information measuring method comprising:

disposing a first reference point and a second reference point on the plane, wherein a first normal line of the lens passes through the optical center and intersects with the plane at a third reference point;

measuring a first distance and a second distance between the first reference point, the second reference point and the third reference point;

capturing an image including the first reference point, the second reference point and the third reference point;

analyzing the image to define a first reference line and a second reference line, wherein the first reference line passes through the first reference point and the optical center, and the second reference line passes through the second reference point and the optical center;

determining a first angle and a second angle according to the first reference line, the second reference line and the first normal line; and determining the installation height and/or the shooting angle according to the first distance, the second distance, the first angle and the second angle;

wherein the third reference point is located between the first reference point and the second reference point, the first reference point and the third reference point are spaced by the first distance, the second reference point and the third reference point are spaced by the second distance, the first angle is included between the first reference line and the first normal line, and the second angle is included between the second reference line and the first normal line;

wherein a second normal line of the plane passes through the optical center, the second normal line intersects with the plane at a fourth reference point, the first reference point is located between the third reference point and the fourth reference point, a third angle is included between the first reference line and the second normal line, the third angle, the shooting angle and the installation height are obtained by equations of:

$$\tan(\theta 3) = \frac{\left\{1 - \frac{\frac{D1}{D2}[\tan(\theta 1 + \theta 2) - \tan(\theta 1)]}{\tan(\theta 1)}\right\}}{\tan(\theta 1 + \theta 2)};$$

$$\theta c = \theta 1 + \theta 3; \text{ and}$$

$$h = \frac{D2}{[\tan(\theta 1 + \theta 2 + \theta 3) - \tan(\theta 1 + \theta 3)]};$$

Wherein θ1 represents the first angle, θ2 represents the second angle, θ3 represents the third angle, D1 represents the first distance, D2 represents the second distance, θc represents the shooting angle, and h represents the installation height.

2. The information measuring method of claim 1, further comprising:

moving a position generator between the first reference point, the second reference point and the third reference point, so as to measure the first distance and the second distance by the position generator.

3. An information measuring method for measuring installation information of a camera, the camera being disposed over a plane with an installation height and oriented towards the plane with a shooting angle, the camera comprising a lens, the lens having an optical center, the information measuring method comprising:

disposing a first reference point and a second reference point on the plane, wherein a first normal line of the lens passes through the optical center and intersects with the plane at a third reference point;

measuring a first distance and a second distance between the first reference point, the second reference point and the third reference point;

capturing an image including the first reference point, the second reference point and the third reference point;

analyzing the image to define a first reference line and a second reference line, wherein the first reference line passes through the first reference point and the optical center, and the second reference line passes through the second reference point and the optical center;

determining a first angle and a second angle according to the first reference line, the second reference line and the first normal line; and determining the installation height and/or the shooting angle according to the first distance, the second distance, the first angle and the second angle;

wherein the second reference point is located between the first reference point and the third reference point, the first reference point and the second reference point are spaced by the first distance, the second reference point and the third reference point are spaced by the second distance, the first angle is included between the first reference line and the second reference line, and the second angle is included between the second reference line and the first normal line;

wherein a second normal line of the plane passes through the optical center, the second normal line intersects with the plane at a fourth reference point, the first reference point is located between the second reference point and the fourth reference point, a third angle is included between the first reference line and the second normal line, the third angle, the shooting angle and the installation height are obtained by equations of:

$$\tan(\theta 3) = \frac{\left\{1 - \frac{\frac{D1}{D2}[\tan(\theta 1 + \theta 2) - \tan(\theta 1)]}{\tan(\theta 1)}\right\}}{\tan(\theta 1 + \theta 2)};$$

$$\theta c = \theta 1 + \theta 2 + \theta 3; \text{ and}$$

$$h = \frac{D2}{[\tan(\theta 1 + \theta 2 + \theta 3) - \tan(\theta 1 + \theta 3)]};$$

Wherein θ1 represents the first angle, θ2 represents the second angle, θ3 represents the third angle, D1 represents the first distance, D2 represents the second distance, θc represents the shooting angle, and h represents the installation height.

4. The information measuring method of claim 3, further comprising:
moving a position generator between the first reference point, the second reference point and the third reference point, so as to measure the first distance and the second distance by the position generator.

5. An information measuring method for measuring installation information of a camera, the camera being disposed over a plane with an installation height and oriented towards the plane with a shooting angle, the camera comprising a lens, the lens having an optical center, the information measuring method comprising:
disposing a first reference point and a second reference point on the plane, wherein a first normal line of the lens passes through the optical center and intersects with the plane at a third reference point;

measuring a first distance and a second distance between the first reference point, the second reference point and the third reference point;

capturing an image including the first reference point, the second reference point and the third reference point;

analyzing the image to define a first reference line and a second reference line, wherein the first reference line passes through the first reference point and the optical center, and the second reference line passes through the second reference point and the optical center;

determining a first angle and a second angle according to the first reference line, the second reference line and the first normal line; and determining the installation height and/or the shooting angle according to the first distance, the second distance, the first angle and the second angle;

wherein the first reference point is located between the second reference point and the third reference point, the first reference point and the third reference point are spaced by the first distance, the second reference point and the first reference point are spaced by the second distance, the first angle is included between the first reference line and the first normal line, and the second angle is included between the second reference line and the first reference line;

wherein a second normal line of the plane passes through the optical center, the second normal line intersects with the plane at a fourth reference point, the third reference point is located between the first reference point and the fourth reference point, a third angle is included between the first normal line and the second normal line, the third angle, the shooting angle and the installation height are obtained by equations of:

$$\tan(\theta 3) = \frac{\left\{1 - \frac{\frac{D1}{D2}[\tan(\theta 1 + \theta 2) - \tan(\theta 1)]}{\tan(\theta 1)}\right\}}{\tan(\theta 1 + \theta 2)};$$

$$\theta c = \theta 3; \text{ and}$$

$$h = \frac{D2}{[\tan(\theta 1 + \theta 2 + \theta 3) - \tan(\theta 1 + \theta 3)]};$$

Wherein θ1 represents the first angle, θ2 represents the second angle, θ3 represents the third angle, D1 represents the first distance, D2 represents the second distance, θc represents the shooting angle, and h represents the installation height.

6. The information measuring method of claim 5, further comprising:
moving a position generator between the first reference point, the second reference point and the third reference point, so as to measure the first distance and the second distance by the position generator.

* * * * *